United States Patent
Wu (10) Patent No.: US 12,273,915 B2
(45) Date of Patent: Apr. 8, 2025

(54) METHOD AND APPARATUS FOR DATA TRANSMISSION ON UNLICENSED SPECTRUM, DEVICE, AND STORAGE MEDIUM

(71) Applicant: GUANGDONG OPPO MOBILE TELECOMMUNICATIONS CORP., LTD., Guangdong (CN)

(72) Inventor: Zuomin Wu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 306 days.

(21) Appl. No.: 17/690,551

(22) Filed: Mar. 9, 2022

(65) Prior Publication Data
US 2022/0201750 A1 Jun. 23, 2022

Related U.S. Application Data

(63) Continuation of application No. PCT/CN2019/116853, filed on Nov. 8, 2019.

(51) Int. Cl.
*H04W 74/0808* (2024.01)
*H04W 72/0446* (2023.01)
*H04W 74/00* (2009.01)

(52) U.S. Cl.
CPC ... *H04W 74/0808* (2013.01); *H04W 72/0446* (2013.01); *H04W 74/006* (2013.01)

(58) Field of Classification Search
CPC . H04W 16/14; H04W 72/0446; H04W 72/20; H04W 74/006; H04W 74/08; H04W 74/0808
See application file for complete search history.

(56) References Cited

U.S. PATENT DOCUMENTS 10,194,366 B1 * 1/2019 Govindassamy ..... H04W 76/14
11,864,232 B2 * 1/2024 Moon ............... H04L 27/26025
(Continued)

FOREIGN PATENT DOCUMENTS

CN 110383933 A 10/2019
WO 2019035624 A1 2/2019
(Continued)

OTHER PUBLICATIONS

U.S. Appl. No. 62/904,281 (Year: 2019).*
(Continued)

*Primary Examiner* — Dung B Huynh
(74) *Attorney, Agent, or Firm* — PERKINS COIE LLP (57) ABSTRACT

Provided are a method and apparatus for data transmission on an unlicensed spectrum, a device, and a storage medium, relating to the technical field of communications. The method comprises: acquiring a channel occupancy time (COT); and sending a target uplink transmission to a network device by means of a first time domain resource in the COT, wherein a second time domain resource in the COT can be used by the network device to send a target downlink transmission, and the second time domain resource is located after the first time domain resource on a time domain. In this way, there is a higher probability of a network device accessing an unlicensed spectrum under the condition of ensuring the fair sharing of resources on the unlicensed spectrum.

8 Claims, 5 Drawing Sheets

(56) References Cited

U.S. PATENT DOCUMENTS

| | | | |
|---|---|---|---|
| 11,917,545 B2* | 2/2024 | Lin | H04W 52/0216 |
| 11,917,681 B2* | 2/2024 | Kusashima | H04W 74/0841 |
| 12,137,477 B2* | 11/2024 | Chou | H04L 5/0032 |
| 12,177,744 B2* | 12/2024 | Takeda | H04L 1/1819 |
| 2019/0110307 A1* | 4/2019 | Kim | H04W 74/0808 |
| 2019/0159256 A1 | 5/2019 | Talarico et al. | |
| 2019/0268912 A1* | 8/2019 | Myung | H04W 72/23 |
| 2019/0380064 A1* | 12/2019 | Salem | H04W 74/0808 |
| 2020/0015094 A1* | 1/2020 | Noh | H04W 72/23 |
| 2020/0045735 A1* | 2/2020 | Kim | H04W 52/36 |
| 2020/0053713 A1* | 2/2020 | Bang | H04L 5/0053 |
| 2020/0053798 A1* | 2/2020 | Tsai | H04W 72/23 |
| 2020/0092913 A1* | 3/2020 | Xu | H04W 74/0816 |
| 2020/0100285 A1* | 3/2020 | Roy | H04W 74/0808 |
| 2020/0107369 A1* | 4/2020 | Jeon | H04W 74/006 |
| 2020/0112971 A1* | 4/2020 | Kunt | H04W 72/23 |
| 2020/0112978 A1* | 4/2020 | Zhang | H04W 72/21 |
| 2020/0146058 A1* | 5/2020 | Xu | H04W 72/0453 |
| 2020/0146062 A1* | 5/2020 | Xu | H04W 72/23 |
| 2020/0187251 A1* | 6/2020 | Noh | H04L 5/0082 |
| 2020/0245371 A1* | 7/2020 | Chande | H04W 72/04 |
| 2020/0275484 A1* | 8/2020 | Xu | H04W 72/0453 |
| 2020/0314948 A1* | 10/2020 | Babaei | H04L 1/1819 |
| 2020/0322982 A1* | 10/2020 | Wu | H04W 48/16 |
| 2020/0351942 A1* | 11/2020 | Jia | H04W 74/0808 |
| 2020/0359411 A1* | 11/2020 | Li | H04W 16/14 |
| 2021/0014892 A1* | 1/2021 | Xue | H04L 27/0006 |
| 2021/0050933 A1* | 2/2021 | Myung | H04L 5/0094 |
| 2021/0084683 A1* | 3/2021 | Li | H04W 74/0808 |
| 2021/0092747 A1* | 3/2021 | Cui | H04W 72/542 |
| 2021/0105812 A1* | 4/2021 | Rastegardoost | H04L 1/08 |
| 2021/0105815 A1* | 4/2021 | Salem | H04W 74/0875 |
| 2021/0112536 A1* | 4/2021 | Shah | H04W 74/0808 |
| 2021/0136783 A1* | 5/2021 | Fakoorian | H04W 76/14 |
| 2021/0153245 A1* | 5/2021 | Tooher | H04W 72/0453 |
| 2021/0195639 A1* | 6/2021 | Kim | H04W 16/14 |
| 2021/0218538 A1* | 7/2021 | Myung | H04L 1/1812 |
| 2021/0235492 A1* | 7/2021 | Iyer | H04W 72/23 |
| 2021/0266111 A1* | 8/2021 | Kusashima | H04L 1/1896 |
| 2021/0274555 A1* | 9/2021 | Alfarhan | H04W 74/0808 |
| 2021/0289548 A1* | 9/2021 | Murray | H04W 72/23 |
| 2021/0298072 A1* | 9/2021 | Oh | H04W 74/085 |
| 2021/0307036 A1* | 9/2021 | Myung | H04W 72/1268 |
| 2021/0329470 A1* | 10/2021 | Shen | H04W 24/08 |
| 2021/0329693 A1* | 10/2021 | Nogami | H04W 72/0453 |
| 2021/0345406 A1* | 11/2021 | Myung | H04L 5/0094 |
| 2021/0351890 A1* | 11/2021 | Tang | H04L 27/0006 |
| 2021/0368351 A1* | 11/2021 | Cui | H04W 74/002 |
| 2021/0385864 A1* | 12/2021 | Wu | H04W 74/006 |
| 2021/0392684 A1* | 12/2021 | Tiirola | H04W 72/0453 |
| 2021/0392685 A1* | 12/2021 | Myung | H04W 72/1263 |
| 2022/0014337 A1* | 1/2022 | Ouchi | H04W 74/0808 |
| 2022/0022051 A1* | 1/2022 | Wu | H04W 16/14 |
| 2022/0022248 A1* | 1/2022 | Kwak | H04L 5/0096 |
| 2022/0046722 A1* | 2/2022 | Kim | H04L 5/0048 |
| 2022/0053482 A1* | 2/2022 | Yang | H04L 5/0091 |
| 2022/0060305 A1* | 2/2022 | Ijaz | H04L 5/001 |
| 2022/0070922 A1* | 3/2022 | Talarico | H04W 74/0808 |
| 2022/0070923 A1* | 3/2022 | Li | H04W 74/0808 |
| 2022/0078841 A1* | 3/2022 | Tiirola | H04W 74/0808 |
| 2022/0110118 A1* | 4/2022 | Wu | H04W 24/08 |
| 2022/0132573 A1* | 4/2022 | Roy | H04W 72/23 |
| 2022/0141872 A1* | 5/2022 | Wang | H04W 74/0816 370/329 |
| 2022/0150917 A1* | 5/2022 | Wang | H04W 16/14 |
| 2022/0150922 A1* | 5/2022 | Wu | H04W 72/0446 |
| 2022/0167407 A1* | 5/2022 | Oviedo | H04W 74/0866 |
| 2022/0201750 A1* | 6/2022 | Wu | H04W 74/0808 |
| 2022/0210827 A1* | 6/2022 | Wang | H04W 16/14 |
| 2022/0217544 A1* | 7/2022 | Lin | H04W 72/0446 |
| 2022/0256595 A1* | 8/2022 | Wang | H04W 72/23 |
| 2022/0272753 A1* | 8/2022 | Hakola | H04B 7/0617 |
| 2022/0272754 A1* | 8/2022 | Lei | H04W 74/0816 |
| 2022/0279579 A1* | 9/2022 | He | H04L 27/2607 |
| 2022/0295558 A1* | 9/2022 | Lei | H04L 5/001 |
| 2022/0304058 A1* | 9/2022 | Wang | H04W 72/0446 |
| 2022/0304059 A1* | 9/2022 | Lei | H04W 74/08 |
| 2022/0312481 A1* | 9/2022 | Talarico | H04W 74/0866 |
| 2022/0330338 A1* | 10/2022 | Karaki | H04W 74/0866 |
| 2022/0330340 A1* | 10/2022 | Lei | H04W 74/0816 |
| 2022/0369288 A1* | 11/2022 | Hosseini | H04W 72/1263 |
| 2022/0377683 A1* | 11/2022 | Myung | H04W 74/0816 |
| 2022/0386281 A1* | 12/2022 | Kumagai | H04W 72/23 |
| 2022/0408478 A1* | 12/2022 | Christoffersson | H04W 74/0833 |
| 2023/0035989 A1* | 2/2023 | Awadin | H04W 72/569 |
| 2023/0066772 A1* | 3/2023 | Myung | H04B 7/0404 |
| 2023/0072379 A1* | 3/2023 | Cheng | H04L 12/4633 |
| 2023/0098546 A1* | 3/2023 | Lee | H04L 1/1685 370/329 |
| 2023/0107246 A1* | 4/2023 | Kang | H04W 52/02 370/329 |
| 2023/0232243 A1* | 7/2023 | Noh | H04L 5/0078 370/329 |
| 2023/0232456 A1* | 7/2023 | Hedayat | H04L 5/005 370/329 |
| 2023/0262771 A1* | 8/2023 | Cui | H04L 1/08 370/329 |
| 2024/0090035 A1* | 3/2024 | Moon | H04L 5/0092 |

FOREIGN PATENT DOCUMENTS

| | | |
|---|---|---|
| WO | 2019141069 A1 | 7/2019 |
| WO | 2019195465 A1 | 10/2019 |

OTHER PUBLICATIONS

U.S. Appl. No. 62/906,339 (Year: 2019).*
International Search Report Mailed Jul. 29, 2020 in Application No. PCT/CN2019/116853.
LG Electronics, Discussion on AUL-initiated COT sharing for LAA, 3GPP TSG RAN WG1 Meeting #94, R1-1808464, Gothenburg, Sweden, Aug. 20-24, 2018, 4 pages.
Oppo, On configured grant for NR-U, 3GPP TSG RAN WG1 #97, R1-1906489, Reno, USA, May 13-17, 2019, 4 pages.
Vivo, Discussion on the channel access procedures, 3GPP TSG RAN WG1 #98bis, R1-1910204, Chongqing, China, Oct. 14-20, 2019, 10 pages.
Qualcomm Incorporated, 3GPP TSG RAN WG1 Meeting #98bis, R1 1911097 Chongqing, CN, Oct. 14 Oct. 20, 2019, 18 pages.
EP Search Report Mailed Jun. 27, 2022 in Application No. 19951281.5.
Intel Corporation, Enhancements to configured grants for NR-unlicensed, 3GPP TSG RAN WG1 Meeting AH 1901 Taipei, Taiwan, Jan. 21-25, 2019, R1-1900473, 7 pages.
Qualcomm Incorporated, Channel access procedures for NR unlicensed, 3GPP TSG RAN WG1 Meeting #96 Athens, Greece, Feb. 25-Mar. 1, 2019, R1-1902985, 15 pages.
Office Action of the EP application No. 19951281.5, issued on Nov. 7, 2024. 6 pages.
Notice of Grant of the CN application No. 202311388851.3, issued on Oct. 14, 2024. 5 pages with English translation.

* cited by examiner

METHOD AND APPARATUS FOR DATA TRANSMISSION ON UNLICENSED SPECTRUM, DEVICE, AND STORAGE MEDIUM

CROSS-REFERENCE TO RELATED APPLICATION

The present application is a continuation application of International PCT Application No. PCT/CN2019/116853, filed on Nov. 8, 2019, the entire content of which is hereby incorporated by reference.

TECHNICAL FIELD

The present application relates to the field of communication technologies, and in particular to a method and apparatus for transmitting data on an unlicensed spectrum, a device, and a storage medium.

BACKGROUND

An unlicensed spectrum is a kind of shared spectrum. In order to enable various communication devices to coexist amicably on the unlicensed spectrum, regulatory requirements required to be met when the unlicensed spectrum is used, have been stipulated in some countries or regions. For example, a Listen-Before-Talk (LBT) principle is required to be followed, that is, a terminal (User Equipment) needs to perform LBT on the unlicensed spectrum, and obtains Channel Occupancy Time (COT) of one time for data transmission after the LBT is successful.

SUMMARY

Embodiments of the present application provide a method and apparatus for transmitting data on an unlicensed spectrum, a device, and a storage medium, so as to share COT obtained by a terminal with a network device. Technical solutions will be described as follows.

In one aspect, there is provided a method for transmitting data on an unlicensed spectrum, which is applied in a terminal and includes: acquiring Channel Occupancy Time (COT), wherein the COT at least includes a first time domain resource and a second time domain resource, the first time domain resource belongs to a first transmission opportunity, the second time domain resource is located after the first time domain resource in a time domain, and the second time domain resource is applicable for a network device to send target downlink transmission; and sending target uplink transmission to the network device through the first time domain resource.

In another aspect, there is provided a method for transmitting data on an unlicensed spectrum, which is applied in a network device and includes: receiving target uplink transmission sent by a terminal on a first time domain resource; and determining whether a second time domain resource is applicable for sending target downlink transmission according to a reception result of the target uplink transmission; wherein the first time domain resource and the second time domain resource are time domain resources in Channel Occupancy Time (COT) acquired by the terminal, the first time domain resource belongs to a first transmission opportunity, and the second time domain resource is located after the first time domain resource in a time domain.

In another aspect, there is provided an apparatus for transmitting data on an unlicensed spectrum, which includes: an acquisition module configured to acquire Channel Occupancy Time (COT), wherein the COT at least includes a first time domain resource and a second time domain resource, the first time domain resource belongs to a first transmission opportunity, the second time domain resource is located after the first time domain resource in a time domain, and the second time domain resource is applicable for a network device to send target downlink transmission; and a sending module configured to send target uplink transmission to the network device through the first time domain resource.

In another aspect, there is provided an apparatus for transmitting data on an unlicensed spectrum, which includes: a receiving module configured to receive target uplink transmission sent by a terminal on a first time domain resource; and a determining module configured to determine whether a second time domain resource is applicable for sending target downlink transmission according to a reception result of the target uplink transmission; wherein the first time domain resource and the second time domain resource are time domain resources in Channel Occupancy Time (COT) acquired by the terminal, the first time domain resource belongs to a first transmission opportunity, and the second time domain resource is located after the first time domain resource in a time domain.

In another aspect, there is provided a communication system including a terminal and a network device, the terminal including the apparatus as described above, and the network device including the apparatus as described above.

In another aspect, there is provided a terminal, which includes a processor and a memory, the memory stores at least one instruction, and the at least one instruction is used for being executed by the processor to implement the method described in any one of the above aspects.

In another aspect, there is provided a network device, which includes a processor and a memory, the memory stores at least one instruction, and the at least one instruction is used for being executed by the processor to implement the method described in any one of the above aspects.

In another aspect, there is provided a computer-readable storage medium, instructions are stored on the computer-readable storage medium, and when the instructions are executed by a processor, the method performed by the terminal or the method performed by the network device, described in above aspects, is implemented.

In another aspect, there is provided a computer program product containing instructions, which, when running on a computer, enable the computer to perform the method performed by the terminal or the method performed by the network device, described in above aspects.

Beneficial effects brought by the technical solutions provided by the embodiments of the present application include at least following effects.

By sharing the second time domain resource in the COT with the network device for the target downlink transmission, the unlicensed spectrum may be used more efficiently in a case that fair sharing of resources on the unlicensed spectrum is ensured; meanwhile, the network device may have a higher probability of accessing the unlicensed spectrum.

BRIEF DESCRIPTION OF DRAWINGS

In order to describe the technical solutions in the embodiments of the present application more clearly, drawings that need to be used in the description of the embodiments will be briefly introduced below. It is apparent that the drawings described below are only some embodiments of the present application, and for those of ordinary skill in the art, other drawings may also be obtained according to these drawings without paying an inventive effort.

DETAILED DESCRIPTION

In order to make purposes, technical solutions, and advantages of the present application clearer, implementation modes of the present application will be further described in detail below in conjunction with the accompanying drawings.

Before a method for transmitting data on an unlicensed spectrum according to an embodiment of the present application is introduced in detail, terms and communication systems involved in the embodiments of the present application will be introduced briefly. An unlicensed spectrum is a spectrum classified by countries and regions to be used for communication of radio devices. This spectrum is generally regarded as a shared spectrum, that is, communication devices in different communication systems may use this spectrum without applying for a proprietary spectrum license from a government, as long as they meet regulatory requirements set by the countries or regions on this spectrum.

Cat-1 LBT refers to an LBT mode in which a communication device (terminal or base station) performs transmission directly without channel detection after a gap ends.

Cat-2 LBT refers to a channel access mode in which a communication device performs single slot channel detection. Further, Cat-2 LBT may be divided into Cat-2 LBT of 25 microseconds and Cat-2 LBT of 16 microseconds according to different detection time intervals.

Cat-3 LBT means that a channel access mode of a communication device is multi-slot channel detection based on random backoff of a fixed contention window size.

Cat-4 LBT means that a channel access mode of a communication device is multi-slot channel detection based on random backoff adjusted according to a contention window size. Exemplarily, Cat-4 LBT may include different channel access priorities according to different priorities of transmission services, for example, referring to Table 1, which shows channel access parameters corresponding to different channel access priorities under Cat-4 LBT. The smaller the value of p is, the higher the channel access priority is.

Figure 1:
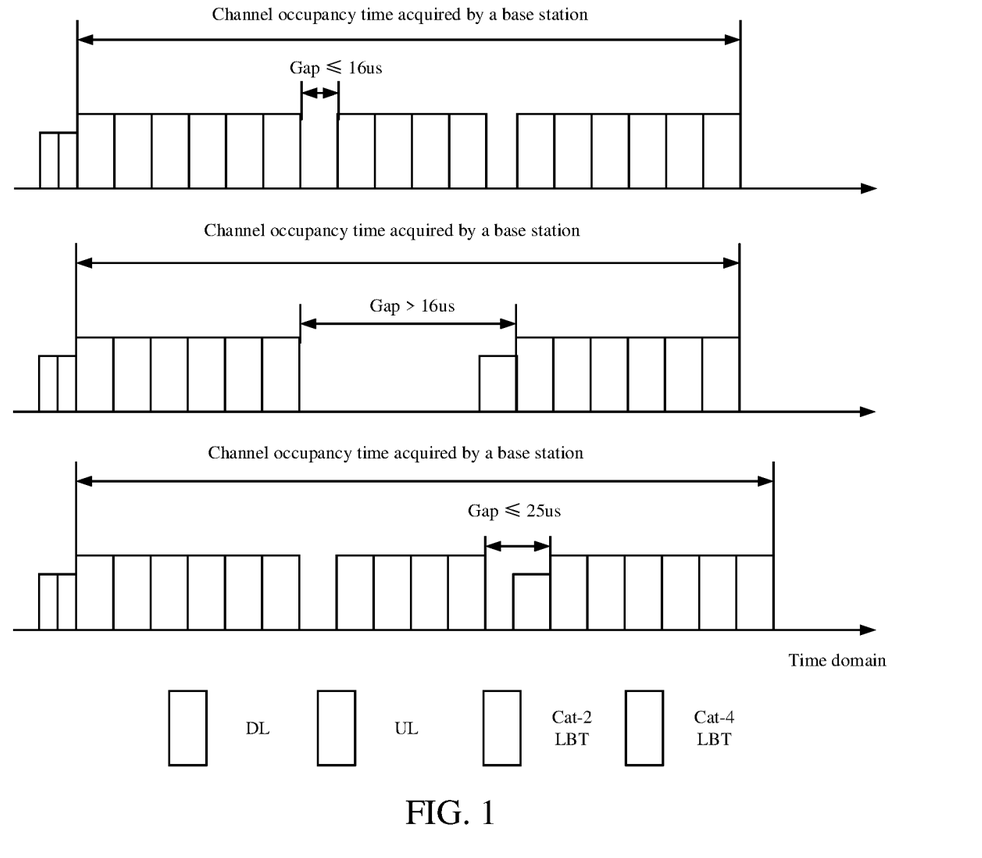
FIG. 1 is a schematic diagram of acquiring COT by a terminal according to an exemplary embodiment of the present application.

Channel access solutions applied in different transmission scenarios are different, and channel access solutions applied to different signals or channels are also different. As shown in FIG. 1, after a network device initiates COT, resources in the COT may be used for a terminal to perform uplink transmission. For an uplink transmission opportunity that occurs in the COT of the network device, if a gap between a starting position of the uplink transmission opportunity and an ending position of a downlink transmission opportunity is less than 16 μs, the terminal may immediately perform the uplink transmission (or in other words, Cat-1 LBT); if there is no downlink transmission opportunity behind the uplink transmission opportunity in the COT of the network device, the terminal may perform Cat-2 LBT before transmission; if a gap between any two adjacent transmissions is less than or equal to 25 μs in the COT of the network device, the terminal may perform Cat-2 LBT.

It should be understood that a mode by which a communication device obtains channel occupancy time may be a channel access mode of Load-based equipment (LBE), that is, the communication device may perform LBT on an unlicensed spectrum after a service arrives, and start sending of signals after the LBT is successful; or it may be a channel access mode of Frame-based equipment (FBE), that is, the communication device periodically performs the LBT on an unlicensed spectrum.

If it is the channel access mode of LBE, the network device or terminal device may obtain the channel occupancy time through Cat-4 LBT. Cat-4 LBT may mean that a channel detection mode of the communication device is multi-slot channel detection based on random backoff adjusted according to a contention window size. Specifically, Cat-4 LBT may include different channel access priorities according to priorities of transmission services. Table 1 and Table 2 are two examples of channel access parameters corresponding to different channel access priorities under Cat-4 LBT. The smaller the value of p is, the higher the channel access priority is. Optionally, Table 1 is used for channel access of the network device, and Table 2 is used for channel access of the terminal.

TABLE 1

| Channel access priority | m | $CW_{min}$ | $CW_{max}$ | $T_{mcot}$ | Allowable value of CW |
|---|---|---|---|---|---|
| 1 | 2 | 3 | 7 | 2 ms | {3, 7} |
| 2 | 2 | 7 | 15 | 4 ms | {7, 15} |

TABLE 1-continued

| Channel access priority | m | $CW_{min}$ | $CW_{max}$ | $T_{mcot}$ | Allowable value of CW |
|---|---|---|---|---|---|
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

TABLE 2

| Channel access priority | m | $CW_{min}$ | $CW_{max}$ | $T_{mcot}$ | Allowable value of CW |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

It should be noted that in the above Tables 1 and 2, m refers to a quantity of backoff slots corresponding to a channel access priority, CW refers to a contention window size corresponding to a channel access priority, $CW_{min}$ refers to a minimum value of a CW corresponding to a channel access priority, $CW_{max}$ refers to a maximum value of a CW corresponding to a channel access priority, and $T_{mcot}$ refers to a length of maximum channel occupancy time corresponding to a channel access priority P. It should be understood that Table 1 is just an example, and channel access parameters under different channel access priorities may have other values.

Figure 2:
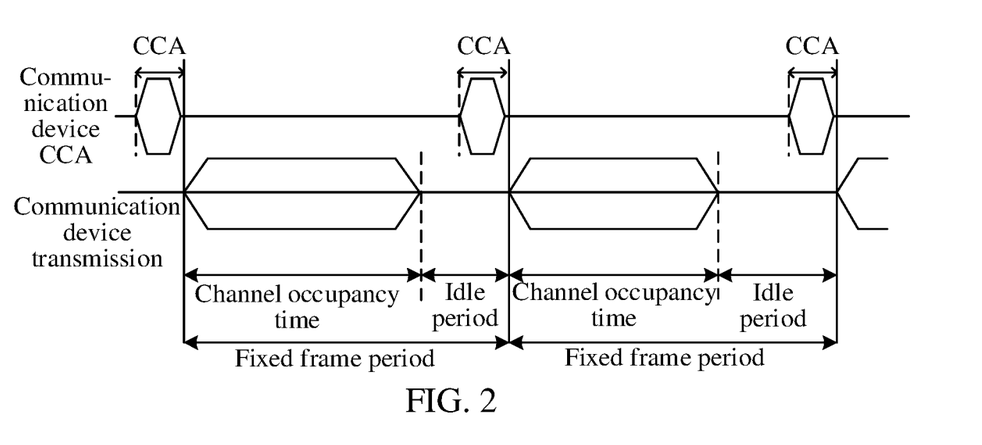
FIG. 2 is a schematic diagram of a fixed frame period according to an exemplary embodiment of the present application.

When it is based on the channel access mode of FBE, as shown in FIG. 2, in this mode, a frame structure occurs periodically. A fixed frame period (a length of which does not exceed a preset value, such as 10 ms), channel occupancy time (a length of which does not exceed 95% of a fixed frame period), and idle time (a length of which is at least 5% of channel occupancy time, its minimum value is 100 µs, and it is located at an end of a fixed frame period) are included in one frame structure. The network device performs LBT (which, for example, may be single slot channel detection) on an unlicensed spectrum in gap time. If the LBT is successful, channel occupancy time in a next fixed frame period may be used for transmission of signals; If the LBT is failed, the channel occupancy time in the next fixed frame period cannot be used for transmission of signals. In other words, channel resources that may be used by the communication device for sending services occur periodically.

Next, communication systems involved in the embodiments of the present application will be introduced briefly.

The technical solutions of the embodiments of the present application may be applied to various communication systems compatible with an unlicensed spectrum, such as a long term evolution (LTE) system, an LTE frequency division duplex (FDD) system, a LTE time division duplex (TDD) system, an advanced long term evolution (LTE-A) system, a new radio (NR) system, an evolution system of an NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, wireless local area networks (WLANs), wireless fidelity (WiFi), a next generation communication system, or other communication systems. A communication system, which is an NR-U system, is taken as an example in the embodiments of the present application.

Generally speaking, a quantity of connections supported by a traditional communication system is limited, and the connections are also easy to implement. However, with development of communication technologies, a mobile communication system will support not only traditional communication, but also device to device (D2D) communication, machine to machine (M2M) communication, machine type communication (MTC), or vehicle to vehicle (V2V) communication, etc., for example. The embodiments of the present application may also be applied to these communication systems.

System architectures and service scenarios described in the embodiments of the present application are intended to illustrate the technical solutions of the embodiments of the present application more clearly, and do not constitute a limitation to the technical solutions provided by the embodiments of the present application. Those of ordinary skilled in the art may know that with evolvement of network architectures and emergence of new service scenarios, the technical solutions provided by the embodiments of the present application are also applicable to similar technical problems.

Figure 3:
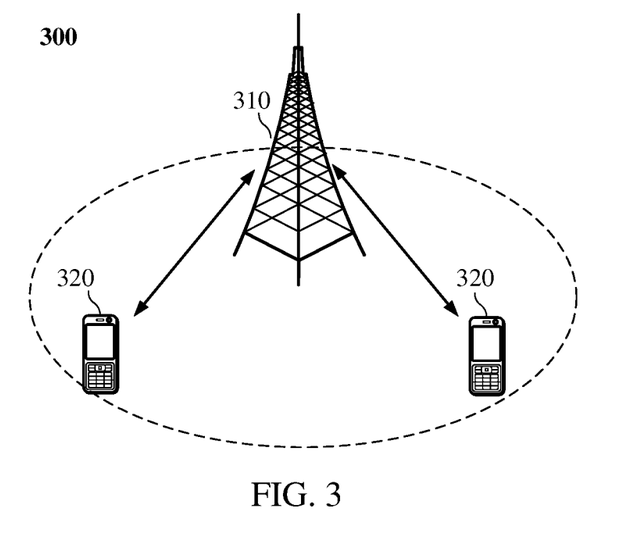
FIG. 3 is a schematic diagram of a communication system according to an exemplary embodiment of the present application.

Exemplarily, a communication system 300 applied in an embodiment of the present application is shown in FIG. 3. The communication system 300 may include a network device 310. The network device 310 may be a device that communicates with a terminal 320 (or referred to as a communication terminal, or a terminal). The network device 310 may provide communication coverage for a specific geographical area, and may communicate with a terminal located within the coverage area. Optionally, the network device 310 may be an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network device in a 5G network, or a network device in a future communication system.

The communication system 300 further includes at least one terminal 320 located within the coverage area of the network device 310. The "terminal" as used herein includes, but is not limited to, an apparatus configured to receive/send communication signals via a wired line connection, for example, via a Public Switched Telephone Networks (PSTN), a Digital Subscriber Line (DSL), a digital cable, or a direct cable; and/or another data connection/network; and/or via a wireless interface, for example, for a cellular network, a Wireless Local Area Network (WLAN), a digital television network such as a Digital Video Broadcasting-Handheld (DVB-H) network, a satellite network, or an Amplitude Modulation-Frequency Modulation (AM-FM) broadcast transmitter; and/or another terminal; and/or an Internet of Things (IoT) device. A terminal configured to communicate via a wireless interface may be referred to as "a wireless communication terminal", "a wireless terminal", or "a mobile terminal". An example of the mobile terminal includes, but is not limited to, a satellite or cellular phone; a Personal Communications System (PCS) terminal capable of combining a cellular radio phone with data processing, facsimile, and data communication abilities; a Personal Digital Assistant (PDA) that may include a radio phone, a pager, internet/intranet access, a Web browser, a memo pad, a calendar, and/or a Global Positioning System (GPS) receiver; and a conventional laptop and/or palmtop receiver, or another electronic apparatus including a radio phone transceiver. The terminal may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal in a 5G network, or a terminal in future evolved Public Land Mobile Network (PLMN), etc.

Optionally, Device to Device (D2D) communication may be performed between terminals 320.

Optionally, a 5G communication system or a 5G network may also be referred to as a New Radio (NR) system or an NR network.

FIG. 3 illustrates exemplarily one network device and two terminals. Optionally, the communication system 300 may include a plurality of network devices, and other numbers of terminals may be included within a coverage area of each network device, which is not limited in the embodiments of the present application.

Optionally, the communication system 300 may also include other network entities, such as a network controller and a mobile management entity, which is not limited in the embodiments of the present application.

It should be understood that a device with a communication function in a network/system in the embodiments of the present application may be referred to as a communication device. Taking the communication system 300 shown in FIG. 3 as an example, the communication device may include a network device 310 and a terminal 320 which have communication functions, and the network device 310 and the terminal 320 may be specific devices described above, and will not be described repeatedly herein. The communication device may also include another device in the communication system 300, such as a network controller, a mobile management entity, and another network entity, which is not limited in the embodiments of the present application.

Figure 4:
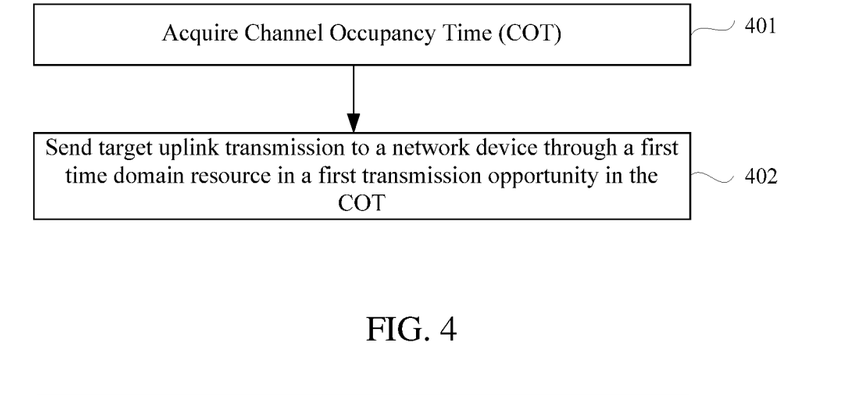
FIG. 4 is a flowchart of a method for transmitting data on an unlicensed spectrum according to an exemplary embodiment of the present application.

FIG. 4 is a flowchart of a method for transmitting data on an unlicensed spectrum according to an exemplary embodiment of the present application. The method for transmitting data on the unlicensed spectrum may be applied to the communication system shown in FIG. 3 above, and the method for transmitting data on the unlicensed spectrum may include at least some of following contents.

In act 401, Channel Occupancy Time (COT) is acquired.

The COT at least includes a first time domain resource and a second time domain resource, the first time domain resource belongs to a first transmission opportunity, the second time domain resource is located after the first time domain resource in a time domain, and the second time domain resource is applicable for a network device to send target downlink transmission.

In one example, the second time domain resource belongs to a second transmission opportunity, which, however, is not limited in the present application.

COT refers to a length of time during which a channel of an unlicensed spectrum may be used for data transmission after LBT is successful. The data transmission performed within COT of one time may be discontinuous. Generally, the COT of one time cannot exceed 20 ms at the most.

The first transmission opportunity may be understood as first uplink transmission performed by a terminal within the COT obtained by the terminal, and the first time domain resource is a time domain resource used in the first transmission opportunity.

In act 402, target uplink transmission is sent to a network device through a first time domain resource in a first transmission opportunity of the COT.

In one example, before the COT is acquired, the method may further include a following act of receiving an uplink grant sent by a network device, and determining according to the uplink grant that a first time domain resource is used for sending target uplink transmission.

To sum up, in the method according to this embodiment, the network device performs the target downlink transmission using the second time domain resource in the COT, so that the unlicensed spectrum may be used more efficiently in a case that fair sharing of a resource on the unlicensed spectrum is ensured; meanwhile, the network device may have a higher probability of accessing the unlicensed spectrum.

Figure 5:
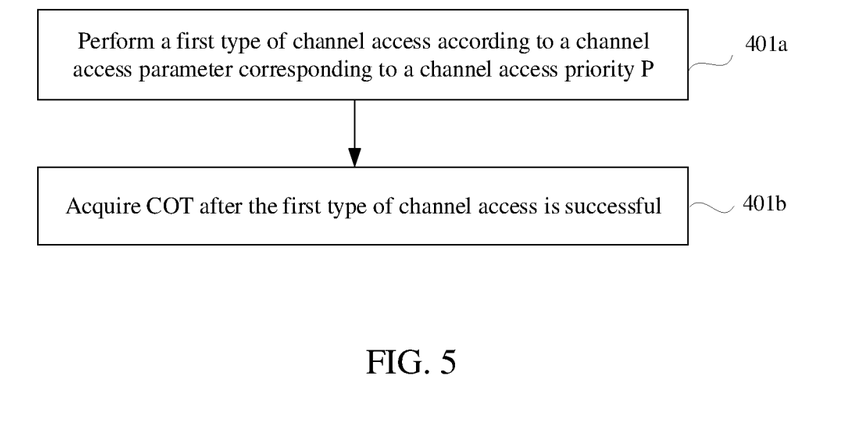
FIG. 5 is a flowchart of a method for transmitting data on an unlicensed spectrum according to another exemplary embodiment of the present application.

In an optional embodiment based on FIG. 4, FIG. 5 shows a flowchart of a method for transmitting data on an unlicensed spectrum according to an exemplary embodiment of the present application. In this embodiment, the act 401 in FIG. 4 may be implemented as acts 401a and 401b as follows instead.

In act 401a, a first type of channel access is performed according to a channel access parameter corresponding to a channel access priority P.

The first type of channel access may be considered as Cat-4 LBT, which is a channel access method of multi-slot channel detection based on random backoff adjusted according to a contention window size. Cat-4 LBT may be divided into different channel access priorities according to priorities of transmission services. As shown in Table 1, the channel access priorities in Cat-4 LBT may include priority 1, priority 2, priority 3, and priority 4.

In act 401b, COT is acquired after the first type of channel access is successful.

That is, when Cat-4 LBT of the terminal is successful, the terminal may acquire COT, in which the terminal may perform data transmission using a channel of an unlicensed spectrum.

Optionally, a first time domain resource is located in the COT acquired by the network device.

In act 402, target uplink transmission is sent to a network device through a first time domain resource in a first transmission opportunity in the COT.

Optionally, the target uplink transmission includes transmission of a target uplink signal and/or a target uplink channel. The target uplink signal includes at least one of a Sounding Reference Signal (SRS) and an uplink Demodulation Reference Signal (DMRS). The target uplink channel includes at least one of a Physical Uplink Shared Channel (PUSCH), a Physical Uplink Control Channel (PUCCH), and a Physical Random Access Channel (PRACH).

The SRS may be used for measurement of an uplink channel, uplink time-frequency synchronization, or phase tracking.

Optionally, the target downlink transmission includes transmission of a target downlink signal and/or a target downlink channel. The target downlink signal includes at least one of a Synchronization Signal Block (SSB), a Channel Status Information Reference Signal (CSI-RS), and a downlink DMRS. The target downlink channel includes at least one of a Physical Broadcast Control Channel (PBCH), a Physical Downlink Control Channel (PDCCH), a broadcast Physical Downlink Shared Channel (PDSCH), and a unicast Physical Downlink Shared Channel (PDSCH). The broadcast PDSCH is used for transmitting at least one of Remaining Minimum System Information (RMSI), System Information/Screening Indicator (SI), a paging message, and a Random Access Response (RAR).

In one example, the target uplink transmission includes a first Physical Uplink Shared Channel (PUSCH). The terminal sending the target uplink transmission on the first time domain resource includes: the terminal sending a first DMRS on the first time domain resource, the first DMRS being used for demodulating the first PUSCH; or the terminal sending the first PUSCH on the first time domain resource.

In one example, the target uplink transmission includes first Uplink Control Information (UCI). The terminal sending the target uplink transmission on the first time domain resource includes: the terminal sending a second DMRS on the first time domain resource, the second DMRS being used for demodulating the first UCI; or the terminal sending the first UCI on the first time domain resource.

In one example, the target uplink transmission includes a first PUSCH and first UCI. The terminal sending the target uplink transmission on the first time domain resource includes: the terminal sending a first DMRS on the first time domain resource, the first DMRS being used for demodulating the first PUSCH and the first UCI; or the terminal sending the first PUSCH on the first time domain resource; or the terminal sending the first UCI on the first time domain resource.

In one example, the target uplink transmission includes a first PRACH. The terminal sending the target uplink transmission on the first time domain resource includes: the terminal sending a first PRACH sequence on the first time domain resource; or the terminal sending a message A in a two-step random access procedure on the first time domain resource.

In one example, the target uplink transmission includes a first SRS. The terminal sending the target uplink transmission on the first time domain resource includes: the terminal sending the first SRS on the first time domain resource.

Optionally, the target downlink transmission includes downlink transmission sent by the network device to the terminal. The unicast PDSCH may be a PDSCH of the terminal.

Optionally, a distance between an ending position of the target uplink transmission sent by the terminal and a starting position of the target downlink transmission is greater than or equal to a first threshold.

The first threshold at least includes a predefined threshold or a threshold configured by the network device.

In one example, the network device may configure the first threshold for the terminal through parameter indication information.

Optionally, the parameter indication information is configured by the network device for the terminal through a Radio Resource Control (RRC) parameter.

In one example, the parameter indication information is an RRC parameter configured by the network device for COT sharing of the terminal. In another example, the parameter indication information is a minimum Downlink Feedback Information (DFI) delay parameter $D_{DFI}$ in pre-configured licensed uplink transmission, in other words, the parameter indication information is the same as a value of the minimum DFI delay parameter $D_{DFI}$ in the preconfigured licensed uplink transmission, for example, D1=D2.

The minimum DFI delay parameter $D_{DFI}$ includes a minimum distance between an end symbol of a PUSCH and a start symbol of DFI transmission including Hybrid Automatic Repeat-reQuest Acknowledgement (HARQ-ACK) information of the PUSCH. The terminal may assume that if DFI is received from beginning of a symbol no, then the HARQ-ACK information corresponding to the PUSCH, transmission of which ends before $n_0$-$D_{DFI}$ may be considered as valid.

In one example, the parameter indication information is indicated by the network device to the terminal through a physical layer signaling, or the parameter indication information is indicated by the network device to the terminal through a Medium Access Control Control Element (MAC CE).

In one example, the parameter indication information is determined according to processing delay of the network device. Optionally, a length unit of the parameter indication information is a symbol.

Optionally, another transmission, which is uplink transmission or sidelink transmission of the terminal, is also included between the target uplink transmission and the target downlink transmission.

Exemplarily, a length of another transmission is greater than or equal to the first threshold, and second transmission includes a second PUSCH and/or a second SRS.

To sum up, in the method according to this embodiment, the terminal acquires the COT and sends the target uplink transmission to the network device through the first time domain resource in the COT, so that the network device may perform the target downlink transmission using the second time domain resource in the COT, so that the network device may have a higher probability of accessing the unlicensed spectrum.

In an optional embodiment based on FIG. 4, the above method further includes receiving first information from the network device, the first information being used for determining that the second time domain resource is applicable for the network device to send the target downlink transmission.

The first information is information sent by the network device to the terminal and used for instructing the terminal to share the acquired COT with the network device.

Optionally, the first information is transmitted through at least one of Downlink Control Information (DCI), a Radio Resource Control (RRC) signaling, and a Medium Access Control Control Element (MAC CE).

Optionally, the first information includes at least one of: indication information of COT sharing and indication information for a corresponding channel access priority P when the COT is acquired.

To sum up, in the method according to this embodiment, the network device may explicitly instruct the terminal to share the second time domain resource by sending the first information to the terminal, so that the network device may send the target downlink transmission through the second time domain resource, and thus the network device may have a higher probability of accessing the unlicensed spectrum.

In an optional embodiment based on FIG. 4, the above method further includes sending second information to the network device, the second information being used for determining that the second time domain resource is applicable for the network device to send the target downlink transmission.

The second information is information sent by the terminal to the network device and used for instructing the terminal to determine to share the acquired COT with the network device.

Optionally, the second information is transmitted through at least one of Uplink Control Information (UCI) and an uplink Demodulation Reference Signal (DMRS).

Optionally, the second information includes at least one of: indication information for COT sharing, indication information for a channel access priority P used when the COT is acquired, a length of the COT, an ending position of the COT, and a channel access mode corresponding to the second time domain resource.

That is, when the terminal determines to share the acquired COT with the network device, the terminal sends the second information to the network device, and the network device receives the second information and determines that the network device may send the target downlink transmission using the second time domain resource in the COT acquired by the terminal.

To sum up, in the method according to this embodiment, the terminal may determine that the terminal shares the COT with the network device by sending the second information to the network device, so that the network device may send the target downlink transmission through the second time domain resource, and thus the network device may have a higher probability of accessing the unlicensed spectrum.

In an optional embodiment based on FIG. 4, the above method further includes: determining that the second time domain resource in the COT is applicable for the network device to send the target downlink transmission when a time domain length of a time domain resource of uplink transmission is less than maximum channel occupancy time $T_{mcot,\ p}$. The time domain resource of the uplink transmission includes the first time domain resource, and the maximum channel occupancy time is time determined according to a channel access priority P, which is a channel access priority used when the COT is acquired.

The maximum channel occupancy time refers to a maximum time length during which data transmission of one time may be performed using a channel of an unlicensed spectrum after LBT of the terminal is successful. Exemplarily, a maximum value of the maximum time length is 10 ms.

Optionally, the channel access priority P is indicated by the network device; or the channel access priority P is determined by the terminal according to a Quality of Service (QoS) Class identifier (QCI) with a lowest priority in a logical channel group corresponding to the target uplink transmission.

That is, when a time domain length of a time domain resource used for uplink transmission is less than maximum channel occupancy time $T_{mcot,\ p}$, it is indicated implicitly that the terminal shares the second time domain resource in the COT with the network device.

To sum up, in the method according to this embodiment, when the network device determines that there is idle time in the COT acquired by the terminal, the target downlink transmission may be sent through the second time domain resource in the COT acquired by the terminal, so that the network device may have a higher probability of accessing the unlicensed spectrum.

In an optional embodiment based on FIG. 4, the act 401 in FIG. 4 may be implemented as a following act 401*c* instead.

In act 401*c*, when a first time domain resource is located in COT acquired by a network device and it is determined that a second time domain resource is not used for the network device to send target downlink transmission, a second type of channel access is performed, and the COT is acquired after a second type of channel access is successful.

The second type of channel access includes one of following channel access modes: direct transmission after gap time is over, single-slot channel detection with a detection slot length of 16 microseconds, and single-slot channel detection with a detection slot length of 25 microseconds.

The channel access mode of direct transmission after gap time is over refers to Cat-1 LBT, the single-slot channel detection with the detection slot length of 16 microseconds refers to Cat-2 LBT of 16 microseconds, and the single-slot channel detection with the detection slot length of 25 microseconds refers to Cat-2 LBT of 25 microseconds.

Figure 6:
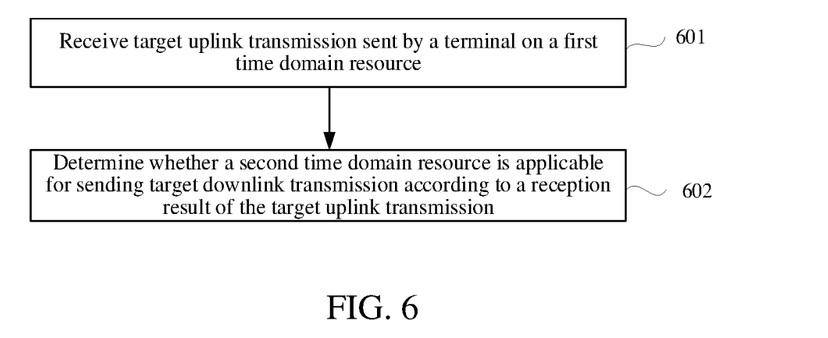
FIG. 6 is a flowchart of a method for transmitting data on an unlicensed spectrum according to another exemplary embodiment of the present application.

FIG. 6 is a flowchart of a method for transmitting data on an unlicensed spectrum according to an exemplary embodiment of the present application. The method for transmitting data on the unlicensed spectrum may be applied to the communication system shown in FIG. 3, and may include at least some of following contents.

In act 601, target uplink transmission sent by a terminal is received on a first time domain resource.

The first time domain resource is a time domain resource in a first transmission opportunity in COT, and the first time domain resource is used for transmitting the target uplink transmission. A network device receives the target uplink transmission of the terminal on the first time domain resource in the COT acquired by the terminal.

Optionally, the target uplink transmission includes transmission of a target uplink signal and/or a target uplink channel. The target uplink signal includes at least one of a Sounding Reference Signal (SRS) and an uplink DMRS. The target uplink channel includes at least one of a Physical Uplink Shared Channel (PUSCH), a Physical Uplink Control Channel (PUCCH), and a Physical Random Access Channel (PRACH). The SRS may be used for measurement of an uplink channel, uplink time-frequency synchronization, or phase tracking.

Exemplarily, when the target uplink transmission includes a first SRS, the network device detecting the target uplink transmission on the first time domain resource includes: the network device detecting the first SRS on the first time domain resource.

In act 602, whether a second time domain resource is applicable for sending target downlink transmission is determined according to a reception result of the target uplink transmission. The second time domain resource is a time domain resource in the Channel Occupancy Time (COT) acquired by the terminal, and the second time domain resource is located after the first time domain resource in a time domain.

Optionally, the target downlink transmission includes transmission of a target downlink signal and/or a target downlink channel. The target downlink signal includes at least one of a Synchronization Signal Block (SSB), a Channel Status Information Reference Signal (CSI-RS), and a downlink DMRS. The target downlink channel includes at least one of a Physical Broadcast Control Channel (PBCH), a Physical Downlink Control Channel (PDCCH), a broadcast Physical Downlink Shared Channel (PDSCH), and a unicast Physical Downlink Shared Channel (PDSCH). The broadcast PDSCH is used for transmitting at least one of Remaining Minimum System Information (RMSI), System Information/Screening Indicator (SI), a paging message, and a Random Access Response (RAR).

Optionally, a distance between an ending position of the target uplink transmission and a starting position of the target downlink transmission is greater than or equal to a first threshold.

The first threshold at least includes a predefined threshold or a threshold configured by the network device.

In one example, before the network device receives the target uplink transmission sent by the terminal on the first time domain resource, the method may further include a following act of sending an uplink grant to the terminal, the uplink grant being used for indicating that the first time domain resource is used for the terminal to send the target uplink transmission.

To sum up, in the method according to this embodiment, the network device receives the target uplink transmission of the terminal on the first time domain resource of the Channel Occupancy Time (COT), and then determines whether the network device may perform the target downlink transmission on the second time domain resource according to the reception result of the target uplink transmission, so that the network device sends the target downlink transmission to the terminal on the second time domain resource, and may have a higher probability of accessing the unlicensed spectrum.

In an optional embodiment based on FIG. 6, the above method further includes sending first information to the terminal, the first information being used for determining that the second time domain resource is applicable for the network device to send the target downlink transmission.

Optionally, the first information is transmitted through at least one of Downlink Control Information (DCI), a Radio Resource Control (RRC) signaling, and a Medium Access Control Control Element (MAC CE).

Optionally, the first information includes at least one of: indication information for COT sharing and indication information for a corresponding channel access priority P when the COT is acquired.

To sum up, in the method according to this embodiment, the network device may explicitly instruct the terminal to share the second time domain resource by sending the first information to the terminal, so that the network device may send the target downlink transmission through the second time domain resource, and thus the network device may have a higher probability of accessing the unlicensed spectrum.

In an optional embodiment based on FIG. 6, the above method further includes receiving second information sent by the terminal, the second information being used for determining that the second time domain resource in the COT is applicable for the network device to send the target downlink transmission.

Optionally, the second information is transmitted through at least one of Uplink Control Information (UCI) and an uplink Demodulation Reference Signal (DMRS).

Optionally, the second information includes at least one of: indication information for COT sharing, indication information for a channel access priority P used when the COT is acquired, a length of the COT, an ending position of the COT, and a channel access mode corresponding to the second time domain resource.

To sum up, in the method according to this embodiment, the terminal may determine that the terminal shares the COT with the network device by sending the second information to the network device, so that the network device may send the target downlink transmission through the second time domain resource, and thus the network device may have a higher probability of accessing the unlicensed spectrum.

In an optional embodiment based on FIG. 6, the above method further includes an act of determining that the second time domain resource is applicable for the network device to send the target downlink transmission according to a reception result of the target uplink transmission when a time domain length of a time domain resource of uplink transmission is less than maximum channel occupancy time $T_{mcot,p}$.

The time domain resource of the uplink transmission includes the first time domain resource, and the maximum channel occupancy time is time determined according to a channel access priority P, which is a channel access priority used when the COT is acquired.

Optionally, the channel access priority P is indicated by the network device; or the channel access priority P is determined by the network device according to a Quality of Service (QoS) Class identifier (QCI) with a lowest priority in a logical channel group corresponding to the target uplink transmission.

To sum up, in the method according to this embodiment, when the network device determines that there is idle time in the COT acquired by the terminal, the target downlink transmission may be sent through the second time domain resource in the COT acquired by the terminal, so that the network device may have a higher probability of accessing the unlicensed spectrum.

In an optional embodiment based on FIG. 6, the act 602 may be implemented, instead, as a following act of determining that the second time domain resource is applicable for sending the target downlink transmission if the target uplink transmission is received, or determining that the second time domain resource is not used for sending the target downlink transmission if the target uplink transmission is not received.

In one example, the target uplink transmission includes a first Physical Uplink Shared Channel (PUSCH). The network device receiving the target uplink transmission includes the network device receiving a first DMRS on the first time domain resource, the first DMRS being used for demodulating the first PUSCH; or the network device receiving the first PUSCH on the first time domain resource.

In one example, the target uplink transmission includes first Uplink Control Information (UCI). The network device receiving the target uplink transmission includes the network device receiving a second DMRS on the first time domain resource, the second DMRS being used for demodulating the first UCI; or the network device receiving the first UCI on the first time domain resource.

In one example, the target uplink transmission includes a first PUSCH and first UCI. The network device receiving the target uplink transmission includes the network device receiving the first Demodulation Reference Signal (DMRS) on the first time domain resource, the first DMRS being used for demodulating the first PUSCH and the first UCI; or the network device receiving the first PUSCH on the first time domain resource; or the network device receiving the first UCI on the first time domain resource.

In one example, the target uplink transmission includes a first Physical Random Access Channel (PRACH). The network device receiving the target uplink transmission includes the network device receiving a first PRACH sequence on the first time domain resource; or the network device receiving a message A in a two-step random access procedure on the first time domain resource.

In one example, the target uplink transmission includes a first SRS. The network device receiving the target uplink transmission includes the network device receiving the first SRS on the first time domain resource. The cases described above may be freely combined.

Optionally, another transmission, which is uplink transmission or sidelink transmission of the terminal, is also included between the target uplink transmission and the target downlink transmission.

It should be noted that, in an optional embodiment based on FIG. 6, the above method further includes: determining that the second time domain resource is not used for sending the target downlink transmission when the first time domain resource is located in the COT acquired by the network device.

For example, when the network device acquires first COT, the network device schedules the terminal to perform the target uplink transmission on the first time domain resource, and then the network device acquires second COT, the first time domain resource is located in the second COT.

If the terminal does not switch a first type of channel access to a second type of channel access, a second time domain resource in third COT acquired by the terminal may be shared with the network device; if the terminal switches the first type of channel access to the second type of channel access, a second time domain resource in third COT acquired by the terminal cannot be shared with the network device.

This is mainly because the terminal first shares the second COT of the network device for uplink transmission, and in order to ensure fairness of channel sharing on the unlicensed spectrum, the network device may only share third COT obtained by the terminal using the first type of channel access for channel access, but cannot share third COT obtained by the terminal using the second type of channel access for channel access.

In an optional embodiment based on FIG. 6, the above method may further include at least one of the following contents.

In one possible implementation, when a length between starting positions of the first time domain resource and the second time domain resource is greater than or equal to a first threshold, the target downlink transmission is sent to the terminal on the second time domain resource.

The first threshold at least includes a predefined threshold or a threshold configured by the network device.

The network device may configure the first threshold for the terminal through indication information.

In one example, the indication information is configured by the network device for the terminal through a Radio Resource Control (RRC) parameter.

In one example, the indication information is an RRC parameter configured by the network device for COT sharing of the terminal. In another example, the indication information is a minimum Downlink Feedback Information (DFI) delay parameter $D_{DFI}$ in preconfigured licensed uplink transmission, in other words, the indication information is the same as a value of the minimum DFI delay parameter $D_{DFI}$ in the preconfigured licensed uplink transmission, for example, D1=D2.

The minimum DFI delay parameter $D_{DFI}$ includes a minimum distance between an end symbol of a PUSCH and a start symbol of DFI transmission including Hybrid Automatic Repeat-reQuest Acknowledgement (HARQ-ACK) information of the PUSCH. The terminal may assume that if DFI is received from beginning of a symbol $n_0$, then HARQ-ACK information corresponding to a PUSCH, transmission of which ends before $n_0 - D_{DFI}$, may be considered as valid.

In one example, the indication information is indicated by the network device to the terminal through a physical layer signaling, or the indication information is indicated by the network device to the terminal through a Medium Access Control Control Element (MAC CE).

Optionally, the indication information is determined according to processing delay of the network device.

Optionally, a length unit of the indication information is a symbol.

For example, when the network device detects the target uplink transmission, such as a DMRS or SRS, or such as a PUSCH or PUCCH or PRACH, sent by the terminal on the first time domain resource, and a length between an ending position of the first time domain resource and a starting position of the second time domain resource is greater than or equal to the first threshold, the network device may share the second time domain resource in the COT of the terminal.

In one possible implementation, a length between an ending position of the target uplink transmission and a starting position of the target downlink transmission is greater than or equal to the first threshold, and the target downlink transmission is sent to the terminal on the second time domain resource.

The first threshold at least includes a predefined threshold or a threshold configured by the network device.

For example, when the network device detects the target uplink transmission, such as a DMRS or SRS, or such as a PUSCH or PUCCH or PRACH, sent by the terminal on the first time domain resource, and a length between an ending position of the target uplink transmission and a starting position of the target downlink transmission is greater than or equal to the first threshold, the network device may share the second time domain resource in the COT of the terminal.

In one possible implementation, when it is confirmed that the target uplink transmission is included on the first time domain resource before specified time, the target downlink transmission is sent to the terminal on the second time domain resource, wherein the specified time at least includes one of: time corresponding to a difference between a starting position of the second time domain resource and a second threshold, and time corresponding to a difference between a starting position of the target downlink transmission and the second threshold. The second threshold at least includes a predefined threshold or a threshold configured by the network device.

It should be noted that various possible embodiments described above may also be freely combined to become new embodiments, which are not limited in the present application.

Figure 7:
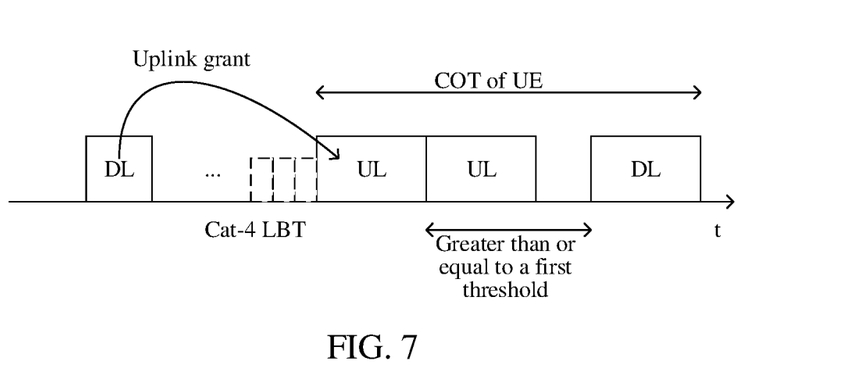
FIG. 7 is a schematic diagram of a method for transmitting data on an unlicensed spectrum according to another exemplary embodiment of the present application.

Exemplarily, in an example as shown in FIG. 7, the network device schedules the terminal to perform the target uplink transmission on the first time domain resource. In the COT acquired by the terminal, when the terminal performs first PUSCH transmission on the first time domain resource, the second time domain resource in the COT is applicable for the network device to send the target downlink transmission in a case that a certain condition is met. Meeting a certain condition may mean that the network device detects a target uplink channel and/or a target uplink signal sent by the terminal on the first time domain resource. When the target downlink transmission of the network device occurs in the COT of the terminal, the network device may transmit directly the target downlink transmission using a channel access mode with a higher priority, such as Cat-1 LBT or Cat-2 LBT of 16 microseconds or Cat-2 LBT of 25 microseconds, after gap time is over, or send the target downlink transmission immediately after single slot channel detection is successful.

If the network device detects a target uplink signal (such as a DMRS or SRS) sent by the terminal on the first time domain resource, or the network device detects a target uplink channel (such as a PUSCH or PUCCH or PRACH) sent by the terminal on the first time domain resource, then the network device may share the second time domain resource in the COT of the terminal, wherein a length between an ending position of the first time domain resource and a starting position of the second time domain resource is greater than or equal to a first threshold. As an example, the first threshold may be configured through a high-layer RRC parameter. Optionally, the first time domain resource is a time domain resource occupied by first uplink transmission in the COT.

Figure 8:
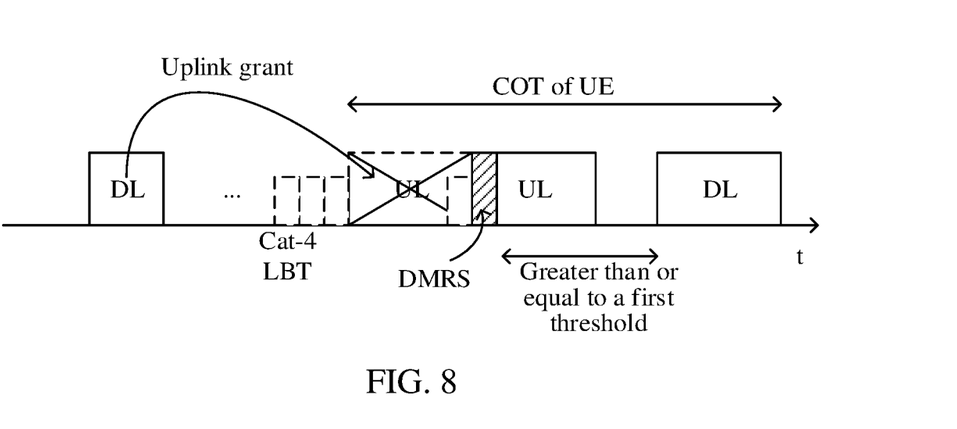
FIG. 8 is a schematic diagram of a method for transmitting data on an unlicensed spectrum according to another exemplary embodiment of the present application.

Exemplarily, in another example as shown in FIG. 8, the network device schedules the terminal to perform a plurality of successive PUSCH transmissions. If the terminal does not obtain channel usage rights of at least some of the plurality of successive PUSCH transmissions (for example, time domain resources of at least one PUSCH), the first time domain resource may refer to a time domain resource which is for uplink transmission first after the terminal obtains the channel usage rights, in the COT acquired by the terminal. Accordingly, the second time domain resource in the COT may be shared with the network device to send the target downlink transmission in a case that a certain condition is met, wherein meeting a certain condition may mean that the network device detects a target uplink channel and/or a target uplink signal sent by the terminal on the first time domain resource. When the target downlink transmission of the network device occurs in the COT of the terminal, the network device may transmit directly the target downlink transmission using a channel access mode with a higher priority, such as Cat-1 LBT or Cat-2 LBT of 16 microseconds or Cat-2 LBT of 25 microseconds, after gap time is over, or send the target downlink transmission immediately after single slot channel detection is successful.

If the network device detects a target uplink signal (such as a DMRS or SRS) sent by the terminal on the first time domain resource, or the network device detects a target uplink channel (such as a PUSCH or PUCCH or PRACH) sent by the terminal on the first time domain resource, then the network device may utilize the second time domain resource in the COT of the terminal, wherein a length between an ending position of the first time domain resource and a starting position of the second time domain resource is greater than or equal to a first threshold. As an example, the first threshold may be configured by a high-layer RRC parameter.

Figure 9:
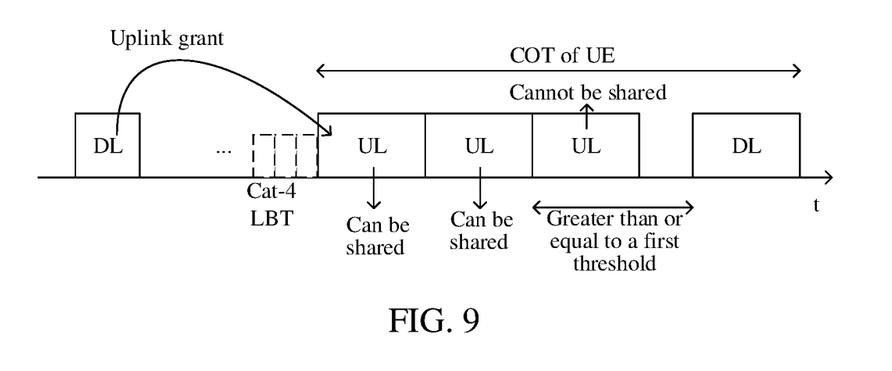
FIG. 9 is a schematic diagram of a method for transmitting data on an unlicensed spectrum according to another exemplary embodiment of the present application.

Exemplarily, in another example as shown in FIG. 9, the network device schedules the terminal to perform a plurality of successive PUSCH transmissions. If the terminal obtains a channel usage right on an unlicensed carrier using Cat-4 LBT, it may be determined whether the second time domain resource in the COT acquired by the terminal is shared with the network device according to time when the terminal obtains the channel usage right.

In the COT acquired by the terminal, if a length of time between the time when the terminal obtains the channel usage right and time when the target uplink transmission ends or time when the target downlink transmission starts is greater than or equal to a first threshold, then the terminal may share the second time domain resource with the network device; or if a length of time between the time when the terminal obtains the channel usage right and time when the target uplink transmission ends or time when the target downlink transmission starts is less than a first threshold, then the terminal cannot share the second time domain resource with the network device.

Optionally, the network device may determine whether the COT acquired by the terminal may be shared according to time when the target uplink channel and/or the target uplink signal sent by the terminal are detected. Optionally, the terminal may indicate whether the second time domain resource in the COT may be shared with the network device by referring to indication information (such as Uplink Control Information carried with a channel).

To sum up, in the method according to this embodiment, before sending the target downlink transmission to the terminal on the second time domain resource, the network device further determines whether the target downlink transmission may be sent to the terminal on the second time domain resource of the COT, and when the determination is yes, the network device sends the target downlink transmission to the terminal on the second time domain resource, such that it may have a higher probability of accessing the unlicensed spectrum.

Figure 10:
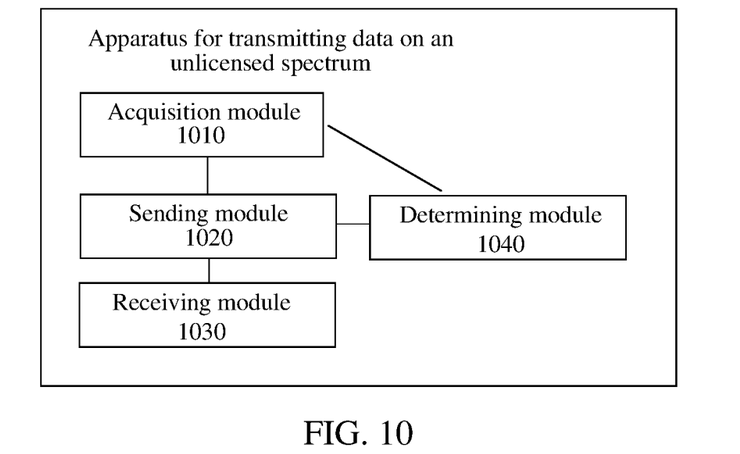
FIG. 10 is a schematic diagram of a structure of an apparatus for transmitting data on an unlicensed spectrum according to one exemplary embodiment of the present application.

FIG. 10 is a structural diagram of an apparatus for transmitting data on an unlicensed spectrum according to an exemplary embodiment of the present application. The apparatus may be configured in a terminal, and may include: an acquisition module 1010 configured to acquire Channel Occupancy Time e (COT), wherein the COT at least includes a first time domain resource and a second time domain resource, the first time domain resource belongs to a first transmission opportunity, the second time domain resource is located after the first time domain resource in a time domain, and the second time domain resource is applicable for a network device to send target downlink transmission; and a sending module 1020 configured to send target uplink transmission to the network device through the first time domain resource.

In one possible implementation of the present application, a distance between an ending position of the target uplink transmission and a starting position of the target downlink transmission is greater than or equal to a first threshold.

The first threshold at least includes a predefined threshold or a threshold configured by the network device.

In one possible implementation of the present application, the apparatus further includes: a receiving module 1030 configured to receive first information from the network device, the first information being used for determining that the second time domain resource is applicable for the network device to send the target downlink transmission.

In one possible implementation of the present application, the first information is transmitted through at least one of Downlink Control Information (DCI), a Radio Resource Control (RRC) signaling, and a Medium Access Control Control Element (MAC CE).

In one possible implementation of the present application, the first information includes at least one of: indication information for COT sharing; and indication information for a corresponding channel access priority P when the COT is acquired.

In one possible implementation of the present application, the sending module 1020 is configured to send second information to the network device, the second information being used for determining that the second time domain resource is applicable for the network device to send the target downlink transmission.

In one possible implementation of the present application, the second information is transmitted through at least one of Uplink Control Information (UCI) and an uplink Demodulation Reference Signal (DMRS).

In one possible implementation of the present application, the second information includes at least one of: indication information for COT sharing; indication information for a channel access priority P used when the COT is acquired; a length of the COT; an ending position of the COT; and a channel access mode corresponding to the second time domain resource.

In one possible implementation of the present application, the apparatus further includes: a determining module 140 configured to determine that the second time domain resource in the COT is applicable for the network device to send the target downlink transmission when a time domain length of a time domain resource of uplink transmission is less than maximum channel occupancy time $T_{mcot, p}$.

The time domain resource of the uplink transmission includes the first time domain resource, and the maximum channel occupancy time is time determined according to a channel access priority P, which is a channel access priority used when the COT is acquired.

In one possible implementation of the present application, the channel access priority P is indicated by the network device; or the channel access priority P is determined by the terminal according to a Quality of Service (QoS) Class identifier (QCI) with a lowest priority in a logical channel group corresponding to the target uplink transmission.

In one possible implementation of the present application, the apparatus further includes: a receiving module 1030 configured to receive an uplink grant sent by the network device; and a determining module 1020 configured to determine that the first time domain resource is used for sending the target uplink transmission according to the uplink grant.

In one possible implementation of the present application, the target uplink transmission includes transmission of a target uplink signal and/or a target uplink channel.

The target uplink signal includes at least one of a Sounding Reference Signal (SRS) and an uplink Demodulation Reference Signal (DMRS).

The target uplink channel includes at least one of a Physical Uplink Shared Channel (PUSCH), a Physical Uplink Control Channel (PUCCH), and a Physical Random Access Channel (PRACH).

In one possible implementation of the present application, the target downlink transmission includes transmission of a target downlink signal and/or a target downlink channel.

The target downlink signal includes at least one of a Synchronization Signal Block (SSB), a Channel Status Information Reference Signal (CSI-RS), and a downlink DMRS.

The target downlink channel includes at least one of a Physical Broadcast Control Channel (PBCH), a Physical Downlink Control Channel (PDCCH), a broadcast Physical Downlink Shared Channel (PDSCH), and a unicast Physical Downlink Shared Channel (PDSCH).

The broadcast PDSCH is used for transmitting at least one of Remaining Minimum System Information (RMSI), System Information/Screening Indicator (SI), a paging message, and a Random Access Response (RAR).

In one possible implementation of the present application, another transmission, which is uplink transmission or sidelink transmission of the terminal, is also included between the target uplink transmission and the target downlink transmission.

In one possible implementation of the present application, the acquisition module 1010 is configured to: perform a first type of channel access according to a channel access parameter corresponding to a channel access priority P; and acquire the COT after the first type of channel access is successful.

In one possible implementation of the present application, the first time domain resource is located in the COT acquired by the network device.

In one possible implementation of the present application, the acquisition module 1010 is configured to: when the first time domain resource is located in the COT acquired by the network device and it is determined that the second time domain resource is not used for the network device to send the target downlink transmission, perform a second type of channel access, and acquire the COT after the second type of channel access is successful.

The second type of channel access includes one of following channel access modes: direct transmission after gap time is over, single-slot channel detection with a detection slot length of 16 microseconds, and single-slot channel detection with a detection slot length of 25 microseconds.

Figure 11:
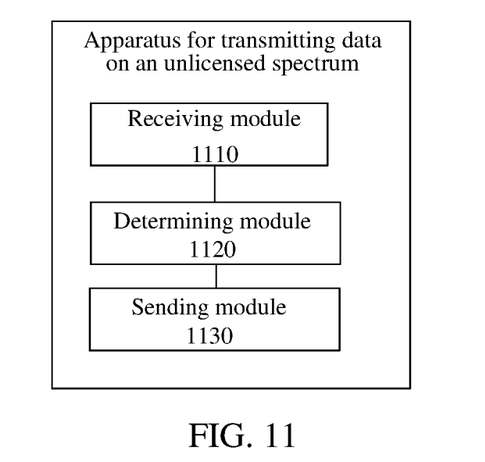
FIG. 11 is a schematic diagram of a structure of an apparatus for transmitting data on an unlicensed spectrum according to another exemplary embodiment of the present application.

FIG. 11 is a structural diagram of an apparatus for transmitting data on an unlicensed spectrum according to an exemplary embodiment of the present application. The apparatus may be configured in a terminal, and may include: a receiving module 1110 configured to receive target uplink transmission sent by the terminal on a first time domain resource; and a determining module 1120 configured to determine whether a second time domain resource is applicable for sending target downlink transmission according to a reception result of the target uplink transmission.

The first time domain resource and the second time domain resource are time domain resources in Channel Occupancy Time (COT) acquired by the terminal, the first time domain resource belongs to a first transmission opportunity, and the second time domain resource is located after the first time domain resource in a time domain.

In one possible implementation of the present application, a distance between an ending position of the target uplink transmission and a starting position of the target downlink transmission is greater than or equal to a first threshold.

The first threshold at least includes a predefined threshold or a threshold configured by a network device.

In one possible implementation of the present application, the apparatus further includes: a sending module 1130 configured to send first information to the terminal, the first information being used for determining that the second time domain resource is applicable for the network device to send the target downlink transmission.

In one possible implementation of the present application, the first information is transmitted through at least one of Downlink Control Information (DCI), a Radio Resource Control (RRC) signaling, and a Medium Access Control Control Element (MAC CE).

In one possible implementation of the present application, the first information includes at least one of: indication information for COT sharing; and indication information for a corresponding channel access priority P when the COT is acquired.

In one possible implementation of the present application, the apparatus further includes: a receiving module 1110 configured to receive second information sent by the terminal, the second information being used for determining that the second time domain resource in the COT is applicable for the network device to send the target downlink transmission.

In one possible implementation of the present application, the second information is transmitted through at least one of Uplink Control Information (UCI) and an uplink Demodulation Reference Signal (DMRS).

In one possible implementation of the present application, the second information includes at least one of: indication information for COT sharing; indication information for a channel access priority P used when the COT is acquired; a length of the COT; an ending position of the COT; and a channel access mode corresponding to the second time domain resource.

In one possible implementation of the present application, the determining module 1120 is further configured to perform an act of determining that the second time domain resource is applicable for the network device to send the target downlink transmission according to a reception result of the target uplink transmission when a time domain length of a time domain resource of uplink transmission is less than maximum channel occupancy time $T_{mcot,\ p}$.

The time domain resource of the uplink transmission includes the first time domain resource, and the maximum channel occupancy time is time determined according to a channel access priority P, which is a channel access priority used when the COT is acquired.

In one possible implementation of the present application, the channel access priority P is indicated by the network device; or the channel access priority P is determined by the network device according to a Quality of Service (QoS) Class identifier (QCI) with a lowest priority in a logical channel group corresponding to the target uplink transmission.

In one possible implementation of the present application, the apparatus further includes: a sending module 1130 configured to send an uplink grant to the terminal, the uplink grant being used for indicating that the first time domain resource is applicable for the terminal to send the target uplink transmission.

In one possible implementation of the present application, the determining module 1120 is configured to determine that the second time domain resource is applicable for sending the target downlink transmission if the receiving module receives the target uplink transmission; or the determining module 1120 is configured to determine that the second time domain resource is not applicable for sending the target downlink transmission if the receiving module does not receive the target uplink transmission.

In one possible implementation of the present application, the target uplink transmission includes transmission of a target uplink signal and/or a target uplink channel.

The target uplink signal includes at least one of a Sounding Reference Signal (SRS) and an uplink DMRS.

The target uplink channel includes at least one of a Physical Uplink Shared Channel (PUSCH), a Physical Uplink Control Channel (PUCCH), and a Physical Random Access Channel (PRACH).

In one possible implementation of the present application, the receiving the target uplink transmission includes at least one of following situations: receiving a first Demodulation Reference Signal (DMRS) on the first time domain resource, the first DMRS being used for demodulating a first Physical Uplink Shared Channel (PUSCH); receiving a first PUSCH on the first time domain resource; receiving a second DMRS on the first time domain resource, the second DMRS being used for demodulating first Uplink Control Information (UCI); receiving the first UCI on the first time domain resource; receiving the first DMRS on the first time domain resource, the first DMRS being used for demodulating the first PUSCH and the first UCI; receiving the first PUSCH on the first time domain resource; receiving the first UCI on the first time domain resource; receiving a first Physical Random Access Channel (PRACH) sequence on the first time domain resource; receiving a message A in a two-step random access procedure on the first time domain resource; and receiving a first Sounding Reference Signal (SRS) on the first time domain resource.

In one possible implementation of the present application, the target downlink transmission includes transmission of a target downlink signal and/or a target downlink channel.

The target downlink signal includes at least one of a Synchronization Signal Block (SSB), a Channel Status Information Reference Signal (CSI-RS), and a downlink Demodulation Reference Signal (DMRS).

The target downlink channel includes at least one of a Physical Broadcast Control Channel (PBCH), a Physical Downlink Control Channel (PDCCH), a broadcast Physical Downlink Shared Channel (PDSCH), and a unicast Physical Downlink Shared Channel (PDSCH).

The broadcast PDSCH is used for transmitting at least one of Remaining Minimum System Information (RMSI), System Information/Screening Indicator (SI), a paging message, and a Random Access Response (RAR).

In one possible implementation of the present application, another transmission, which is uplink transmission or sidelink transmission of the terminal, is also included between the target uplink transmission and the target downlink transmission.

In one possible implementation of the present application, the apparatus further includes: a determining module 1120 configured to determine that the second time domain resource is not applicable for sending the target downlink transmission when the first time domain resource is located in the COT acquired by the network device.

In one possible implementation of the present application, the apparatus further includes: a sending module 1130 configured to send target downlink transmission to the terminal on the second time domain resource when a length between starting positions of the first time domain resource and the second time domain resource is greater than or equal to a first threshold; or send target downlink transmission to the terminal on the second time domain resource when a length between an ending position of the target uplink transmission and a starting position of the target downlink transmission is greater than or equal to a first threshold.

The first threshold at least includes a predefined threshold or a threshold configured by the network device.

In one possible implementation of the present application, the apparatus further includes: a sending module 1130 configured to send the target downlink transmission to the terminal on the second time domain resource when it is confirmed that the target uplink transmission is included on the first time domain resource before specified time, wherein the specified time at least includes one of: time corresponding to a difference between a starting position of the second time domain resource and a second threshold, and time corresponding to a difference between a starting position of the target downlink transmission and a second threshold.

The second threshold at least includes a predefined threshold or a threshold configured by the network device.

Figure 12:
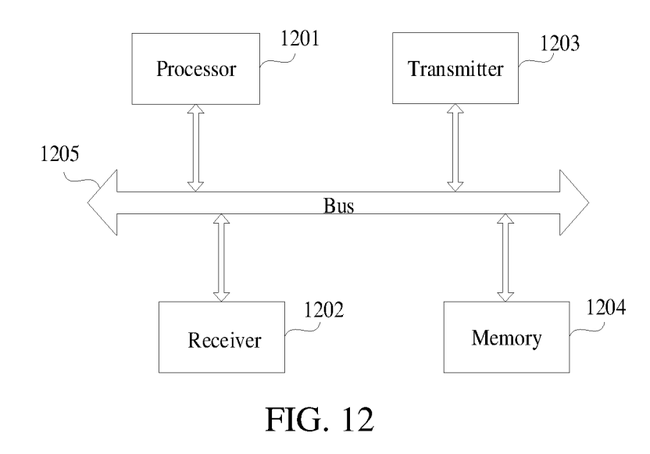
FIG. 12 is a schematic diagram of a structure of a communication device according to an exemplary embodiment of the present application.

Referring to FIG. 12, which is a schematic diagram of a structure of a communication device (a terminal or access network device) according to an exemplary embodiment of the present application. The communication device includes a processor 1201, a receiver 1202, a transmitter 1203, a memory 1204, and a bus 1205.

The processor 1201 includes one or more processing cores. The processor 1201 performs various functional applications and information processing by running software programs and modules.

The receiver 1202 and the transmitter 1203 may be implemented as a communication component, which may be a communication chip.

The memory 1204 is connected to the processor 1201 via the bus 1205.

The memory 1204 may be configured to store at least one instruction, and the processor 1201 is configured to execute the at least one instruction to implement various acts performed by a first Internet Activities Board (IAB) network device in various method embodiments described above.

In addition, the memory 1204 may be implemented by any type of volatile or non-volatile storage device or combinations thereof. The volatile or non-volatile storage device includes, but is not limited to, a magnetic disk or an optical disk, an Electrically Erasable Programmable Read Only Memory (EEPROM), an Erasable Programmable Read Only Memory (EPROM), a Static Random Access Memory (SRAM), a Read Only Memory (ROM), a magnetic memory, a flash memory, and a Programmable Read Only Memory (PROM).

The present application provides a computer-readable storage medium having stored therein at least one instruction, which is loaded and executed by the processor to implement the methods for transmitting data on the unlicensed spectrum according to various method embodiments described above.

The present application further provides a computer program product, which, when running on a computer, enables the computer to perform the methods for transmitting data on the unlicensed spectrum according to various method embodiments described above.

Those skilled in the art should appreciate that, in one or more examples described above, functions described in the embodiments of the present application may be implemented using software, hardware, firmware, or any combination thereof. When implemented using software, these functions may be stored in a computer-readable medium or be transmitted as one or more instructions or codes on the computer-readable medium. The computer-readable medium includes a computer storage medium and a communication medium, wherein the communication medium includes any medium facilitating transfer of a computer program from one place to another place. The storage medium may be any available medium that can be accessed by a general-purpose or special-purpose computer.

What described above is only preferred embodiments of the present application, and is not intended to limit the present application. Any modification, equivalent substitution, improvement, etc., made within the spirit and principles of the present application shall be included in the protection scope of the present application.

The invention claimed is:

1. A method for transmitting data on an unlicensed spectrum, comprising:
    performing, by a terminal, a first type of channel access according to a channel access parameter corresponding to a channel access priority;
    acquiring, by the terminal, Channel Occupancy Time (COT) after the first type of channel access is successful, wherein the COT at least comprises a first time domain resource and a second time domain resource, the first time domain resource belongs to a first transmission opportunity, the second time domain resource is located after the first time domain resource in a time domain, and the second time domain resource is applicable for a network device to send target downlink transmission; wherein the target downlink transmission comprises downlink transmission sent by the network device to the terminal; and
    sending, by the terminal, target uplink transmission to the network device through the first time domain resource;
    the method further comprising:
    receiving first information from the network device, wherein the first information is used for determining that the second time domain resource is applicable for the network device to send unicast downlink transmission, and the first information is transmitted through a Radio Resource Control (RRC) signaling.

2. The method according to claim 1, wherein a distance between an ending position of the target uplink transmission and a starting position of the target downlink transmission is greater than or equal to a first threshold;
    wherein the first threshold at least comprises a predefined threshold or a threshold configured by the network device.

3. The method according to claim 1, wherein the first information comprises at least one of:
    indication information for COT sharing; and
    indication information for a corresponding channel access priority when the COT is acquired.

4. The method according to claim 1, further comprising:
    sending second information to the network device, wherein the second information is used for determining that the second time domain resource is applicable for the network device to send the target downlink transmission;
    wherein the second information comprises at least one of:
    indication information for COT sharing;
    indication information for a channel access priority used when the COT is acquired;
    a length of the COT;
    an ending position of the COT; and
    a channel access mode corresponding to the second time domain resource.

5. The method according to claim 1, further comprising:
    determining that the second time domain resource in the COT is applicable for the network device to send the target downlink transmission when a time domain length of a time domain resource of uplink transmission is less than maximum channel occupancy time $T_{mcot,p}$;
    wherein the time domain resource of the uplink transmission comprises the first time domain resource, and the maximum channel occupancy time is time determined according to a channel access priority (P) which is a channel access priority used when the COT is acquired;
    wherein the channel access priority is indicated by the network device; or
    the channel access priority is determined by a terminal according to a Quality of Service (QoS) Class identifier (QCI) with a lowest priority in a logical channel group corresponding to the target uplink transmission.

6. The method according to claim 1, wherein before the COT is acquired, the method further comprises:
    receiving an uplink grant sent by the network device, and determining that the first time domain resource is used for sending the target uplink transmission according to the uplink grant.

7. The method according to claim 1, wherein the target downlink transmission comprises transmission of a target downlink signal and/or a target downlink channel;

the target downlink signal comprises at least one of a Synchronization Signal Block (SSB), a Channel Status Information Reference Signal (CSI-RS), and a downlink Demodulation Reference Signal (DMRS);

the target downlink channel comprises at least one of a Physical Broadcast Control Channel (PBCH), a Physical Downlink Control Channel (PDCCH), a broadcast Physical Downlink Shared Channel (PDSCH), and a unicast Physical Downlink Shared Channel (PDSCH);

wherein the broadcast PDSCH is used for transmitting at least one of Remaining Minimum System Information (RMSI), System Information/Screening Indicator (SI), a paging message, and a Random Access Response (RAR);

wherein the unicast PDSCH is a PDSCH of the terminal.

8. A terminal comprising a processor and a memory, wherein at least one instruction is stored in the memory, and the at least one instruction is used for being executed by the processor to implement the acts of the method according to claim 1.

* * * * *